United States Patent
Johansson et al.

[11] Patent Number: 5,957,497
[45] Date of Patent: Sep. 28, 1999

[54] STEERING DEVICE IN A RIDING MOWER

[75] Inventors: Sören Johansson; Erland Wikner, both of Tranås, Sweden

[73] Assignee: Stiga AB, Tranas, Sweden

[21] Appl. No.: 08/732,410

[22] PCT Filed: May 12, 1995

[86] PCT No.: PCT/SE95/00525

§ 371 Date: Oct. 25, 1996

§ 102(e) Date: Oct. 25, 1996

[87] PCT Pub. No.: WO95/31891

PCT Pub. Date: Nov. 30, 1995

[30] Foreign Application Priority Data

May 20, 1994 [SE] Sweden .................................. 9401745

[51] Int. Cl.⁶ ...................................................... B62D 1/00
[52] U.S. Cl. ........................... 280/771; 280/774; 280/98; 74/496; 74/501.5; 74/89.22; 56/16.7
[58] Field of Search ................................ 280/771, 98, 99, 280/100, 87.2, 774; 74/492, 494, 496, 498, 502.3, 501.5, 89.22; 56/16.7

[56] References Cited

U.S. PATENT DOCUMENTS

| | | | |
|---|---|---|---|
| 239,432 | 3/1881 | Bollee | 280/771 |
| 833,232 | 10/1906 | Lemp | 74/496 |
| 3,839,610 | 10/1974 | Harlow . | |
| 4,023,434 | 5/1977 | Axelsson | 74/496 |
| 4,257,619 | 3/1981 | Fisher | 280/99 |
| 4,315,751 | 2/1982 | Conrad | 74/502.3 |
| 4,787,646 | 11/1988 | Kamlukin et al. | 280/99 |
| 4,809,489 | 3/1989 | Johansson . | |
| 5,385,213 | 1/1995 | Hake | 280/771 |
| 5,742,975 | 4/1998 | Knowlton et al. | 280/771 |

FOREIGN PATENT DOCUMENTS

| | | |
|---|---|---|
| 454127 | 4/1988 | Sweden . |
| 2088016 | 6/1982 | United Kingdom . |

*Primary Examiner*—Daniel G. DePumpo
*Attorney, Agent, or Firm*—Smith, Gambrell & Russell, LLP; Beveridge, DeGrandi, Weilacher & Young; Intellectual Property Group

[57] ABSTRACT

A device for steering a wheel assembly in a riding mower has a steering sprocket nonrotatably connected to a rotatable steering column and a transmission chain which is flexible in the plane of the steering sprocket and extends over the steering sprocket and forms, on both sides of the steering sprocket, a rectilinear chain run. Two deflecting wheels arranged on both sides of the steering sprocket are positioned in a deflecting wheel plane turned around the respective chain run lines relative to the plane of the steering sprocket. Each of two transmission chains, which extend over the respective deflecting wheels between the free end of the respective chain runs and the wheel assembly, is, between the steering sprocket and the respective deflecting wheels, coupled by way of a link element to the chain, which is flexible in the plane of the steering sprocket, so as to form a straight line with the chain. The link element has a first hinge pin to which an end link in one of the two coupled chains is articulated, and a second hinge pin to which an end link of the other of these two chains is articulated. The two hinge pins are turned relative to each other around the respective lines (L) at an angle equalling the angle at which the respective deflecting wheel plane is turned relative to the plane of the steering sprocket.

16 Claims, 3 Drawing Sheets

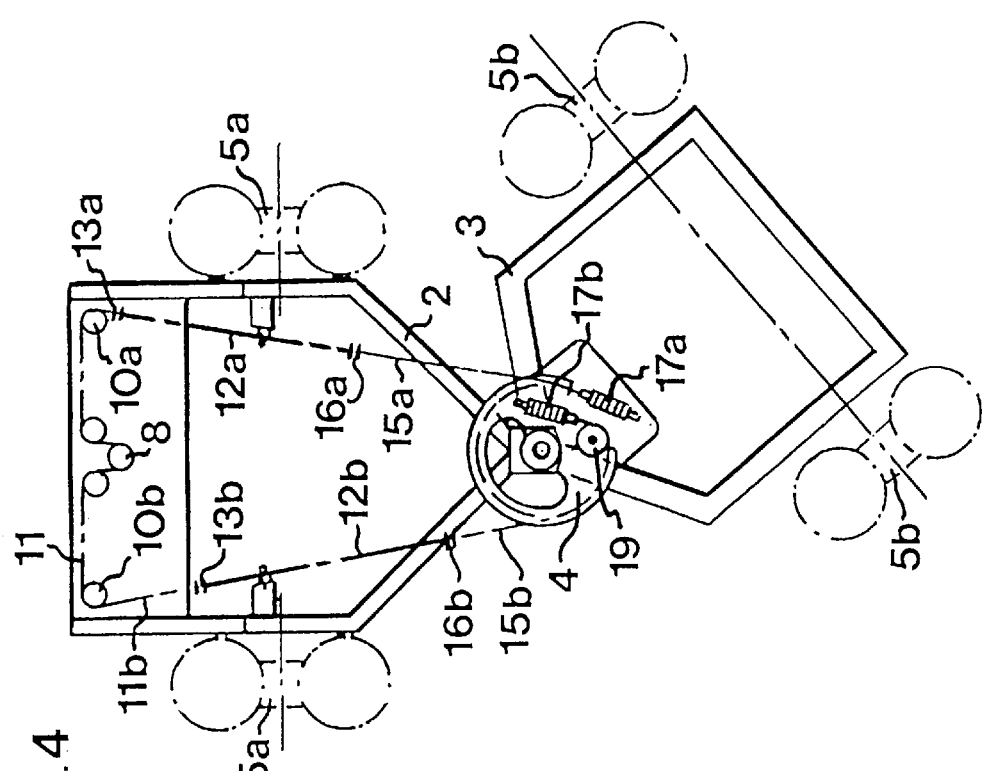
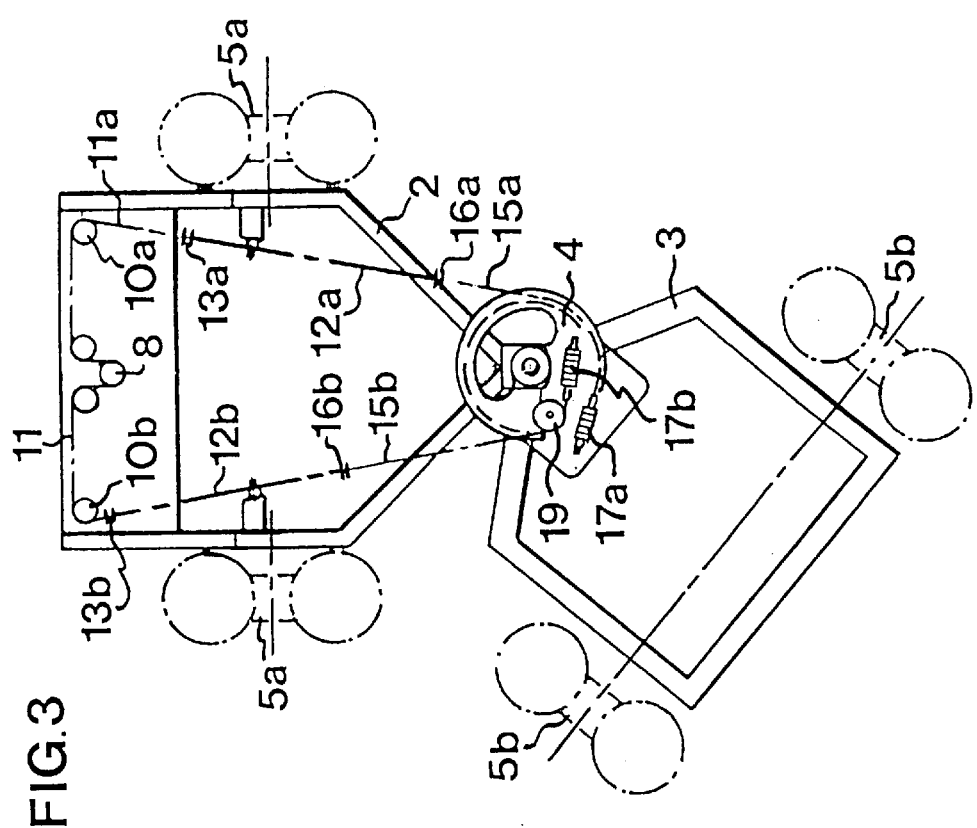

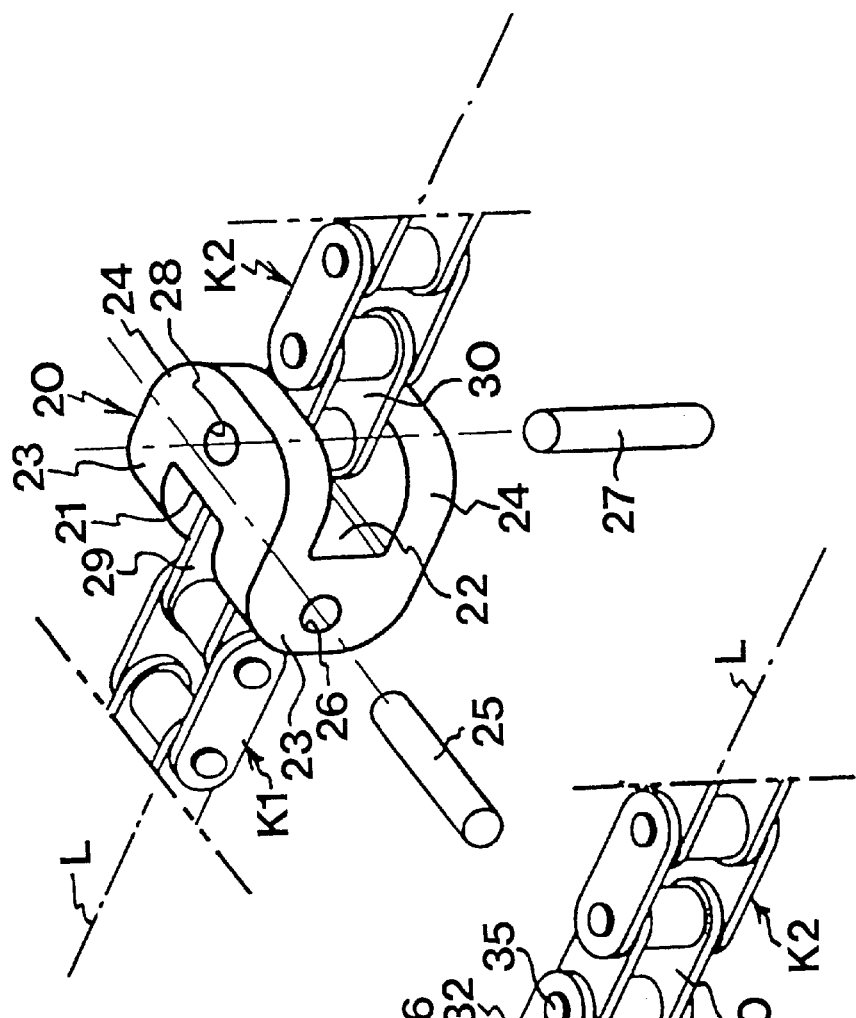

STEERING DEVICE IN A RIDING MOWER

The present invention relates to a steering device in a riding mower having a wheel assembly which is pivotable by means of the steering device, said steering device comprising a rotatable steering column, a steering sprocket nonrotatably connected to the steering column, a transmission chain which is flexible in the plane of the steering sprocket and which extends over the steering sprocket and, on one side of the steering sprocket, forms a first chain run extending along a first straight line and, on the other side of the steering sprocket, forms a second chain run extending along a second straight line, two deflecting wheels which are arranged on both sides of the steering sprocket and located in a second and a third plane, respectively, which is turned around said first and said second straight line, respectively, relative to the plane of the steering sprocket, and two flexible steering wires which at one end are connected to the free end of the respective chain runs, extend over the respective deflecting wheels and at the other end are connected to the wheel assembly.

In a prior art steering device in a riding mower, use is made of a steering wire which is wound round a rotatable steering column and extends over two first deflecting wheels arranged on both sides of the steering column and located in a common plane, and two second deflecting wheels arranged on both sides of the steering column and located in a second and a third plane, respectively, which is substantially orthogonal relative to this common plane, to a steerable wheel assembly, to which it is connected. This steering device suffers from the essential drawback that the steering wire is rapidly worn especially in the portion thereof extending over the steering column, but also in the portions extending over the first and the second deflecting wheels. This results in frequent breaking of the steering wire, thus necessitating replacement.

In order to reduce this drawback, that part of the steering wire which extends over the steering column and the two first deflecting wheels has been replaced in a known steering device, which is of the type described by way of introduction, with a transmission chain extending over a steering sprocket nonrotatably connected to the steering column and located in the same plane as the first two deflecting wheels which here consist of sprockets. This chain is, at each end, connected to a steering wire which like before extends over the respective second deflecting wheels to the steerable wheel assembly. In this prior art steering device, the wear in the area of the steering column is eliminated. The wear problem, however, remains for the steering wires which extend over the other two deflecting wheels and which therefore break relatively frequently.

One object of the present invention therefore is to provide a steering device, in which also this wear problem is eliminated.

This object is achieved by means of a steering device which is of the type mentioned by way of introduction and characterised in that each of the flexible steering wires consists of a transmission chain which is, between the steering sprocket and the respective deflecting wheels, coupled, by means of a link element, to the chain, flexible in the plane of the steering sprocket, so as to form a straight line with said chain, the link element having a first hinge pin to which an end link in one of these two chains is articulated, and a second hinge pin to which an end link in the other of these two chains is articulated, said two hinge pins being turned around said first and said second straight line, respectively, relative to each other at an angle equalling the angle at which the second and the third plane, respectively, is turned relative to the plane of the steering sprocket.

Both the second and the third plane are preferably turned 90° relative to the plane of the steering sprocket.

In a preferred embodiment of the inventive steering device, the two steering wires between the respective deflecting wheels and the wheel assembly are located in a common plane which is angled relative to the second and the third plane, the steering device comprising a steering pulley which is included in said wheel assembly and which is located in this common plane and to which the steering wires are connected, and the steering device being characterised in that each of the chains forming the steering wires consists of two partial chains which between the respective deflecting wheels and the steering pulley are coupled together by means of a link element so as to form a straight line with each other, the link element having a first hinge pin to which an end link of one partial chain is articulated, and a second hinge pin to which an end link of the other partial chain is articulated, said two hinge pins being turned around said straight line relative to each other at an angle equalling the angle at which said common plane is angled relative to the second and the third plane, respectively.

The invention will now be described in more detail with reference to the accompanying drawings.

FIGS. 2–4 illustrate the riding mower from below, the steering device being shown in a starting position, a first end position and a second end position.

FIG. 5 is a perspective view of a first embodiment of a link element.

FIG. 6 is a perspective view of a second embodiment of a link element.

Figure 1:
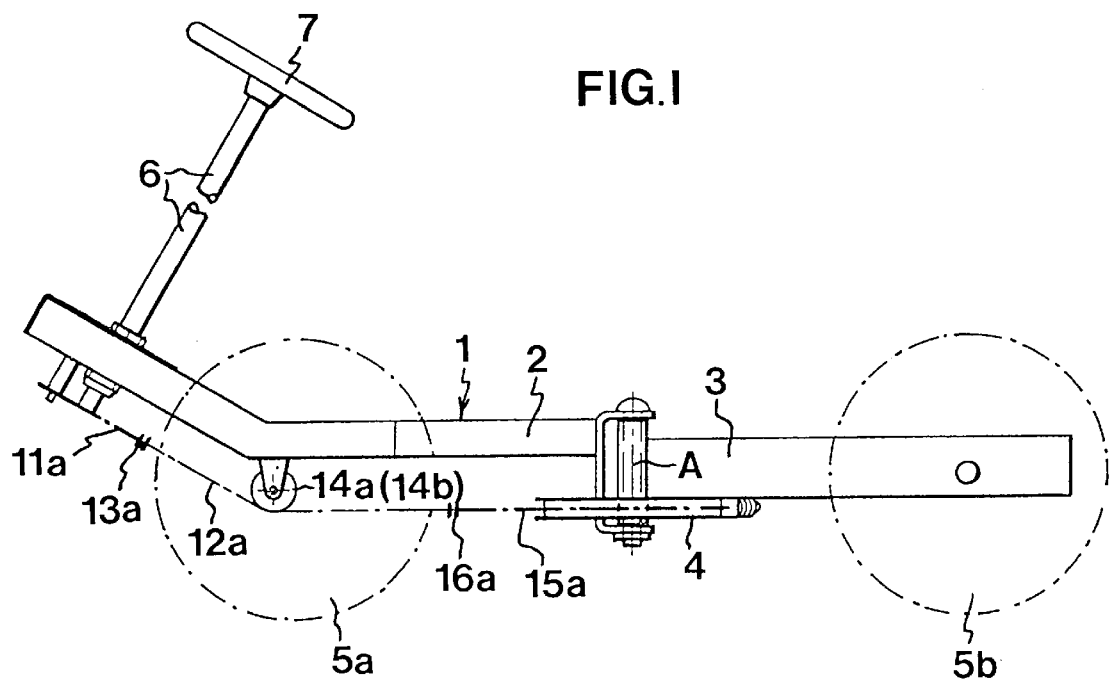
FIG. 1 is a schematic side view and illustrates a riding mower provided with a steering device according to the invention.

The riding mower 1 schematically shown in FIG. 1 is articulated and has a front frame 2 and a rear frame 3 which are pivotally connected to each other about a vertical pivot axis A. The front frame 2 supports the front wheels 5*a* of the riding mower. The rear frame 3 supports the rear wheels 5*b* of the riding mower 1 and is included in a wheel assembly which is pivotable relative to the front frame 2. A steering pulley 4, which is fixedly connected to the rear frame 3 and whose centre axis coincides with the pivot axis A, is also included in the wheel assembly. The steering pulley 4 has two guiding grooves (not shown) which are arranged in two diametrically opposed portions of the circumference of the pulley.

The steering device of the riding mower 1 has a steering column 6 which is rotatably mounted in the front frame 2. The steering column 6 makes an angle of about 30° with the vertical plane and has, at its upper end, a steering wheel 7 for rotating the steering column 6. A steering sprocket 8 is nonrotatably connected to the steering column 6 at the lower end thereof. Four deflecting sprockets 9*a*, 9*b*, 10*a* and 10*b* are arranged in pairs on both sides of the steering sprocket 8 and located in the same plane as this, i.e. in a plane which is inclined about 30° relative to the horizontal plane.

A roller chain 11, which is flexible in the plane of the sprockets, extends over the steering sprocket 8 and the deflecting sprockets 9*a*, 9*b*, 10*a* and 10*b*. The roller chain 11 forms, on one side of the steering sprocket 8, a first chain run 11*a*, which extends rectilinearly backwards from the left-hand outer deflecting sprocket 10*a*, seen in the direction of forward travelling of the riding mower 1, and forms, on the other side of the steering sprocket 8, a second chain run 11*b*, which extends rectilinearly backwards from the right-hand outer deflecting sprocket 10*b*.

The chain runs 11a and 11b are, at their free end, connected to one end of a roller chain 12a and 12b, respectively. Each chain run 11a and 11b and its roller chain 12a and 12b are coupled together by means of a link element 13a and 13b, respectively, described in more detail below, in such a manner that in the coupling area they extend in a straight line with each other. The roller chains 12a and 12b are flexible in the vertical direction and extend backwards over the respective deflecting sprockets 14a and 14b, in front of which they are, as appears from what has been said above, located in the above-mentioned plane inclined about 30°, and behind which they are located in a common horizontal plane. The deflecting sprockets 14a and 14b have horizontal centre axes.

The roller chains 12a and 12b are, at their other end, connected to one end of a roller chain 15a and 15b, respectively. The roller chains 12a and 15a as well as 12b and 15b are coupled together by means of a link element 16a and 16b, respectively, described in more detail below, in such a manner that that part of the roller chain 12a and 12b, respectively, which is positioned behind the respective deflecting sprockets 14a and 14b, and the roller chain 15a and 15b, respectively, extend in a straight line with each other. The roller chains 15a and 15b, which are thus located in said common horizontal plane, are flexible in the horizontal direction and each extend into one of the grooves at the circumference of the steering pulley 4. In a manner known for steering wires, the roller chains 15a and 15b are, at their rear end, connected to the steering pulley 4 via a spring mechanism 17a and 17b, respectively, the point of attachment 18b of the roller chain 15b being located closer to the centre of the steering pulley 4 than the point of attachment 18a of the roller chain 15a. The spring mechanisms 17a and 17b serve to prevent the steering wheel from stopping unresiliently when maximally turned in one or the other direction. The roller chain 15b extends to its point of attachment 18b via a sprocket 19 arranged on the underside of the steering pulley 4.

Figure 2:
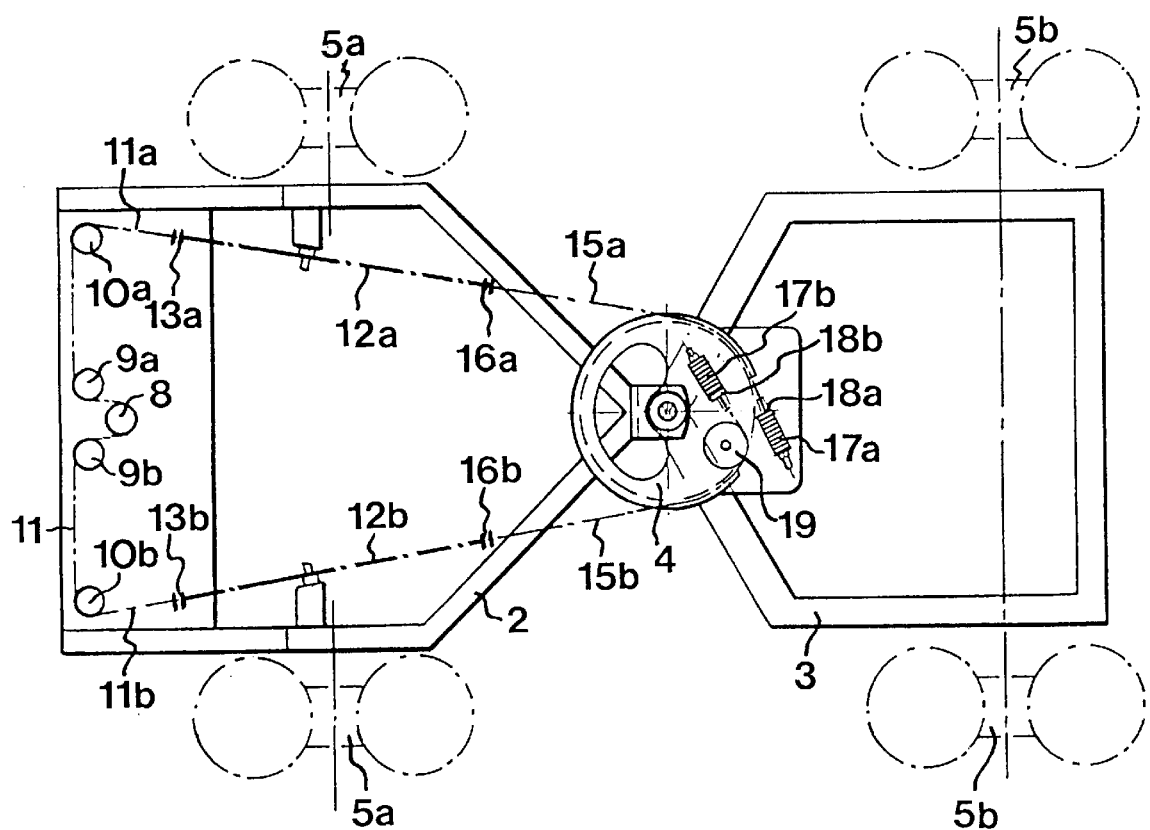

When turning the steering wheel 7 in one direction (clockwise as seen by the driver) from the starting position of the steering device, which is shown in FIG. 2 and in which the riding mower 1 is driven straight ahead, the wheel assembly 3, 4, 5b is pivoted in the direction of the end position shown in FIG. 3, whereby the riding mower 1 turns to the right, and when turning the steering wheel 7 in the opposite direction (anticlockwise as seen by the driver) from the starting position, the wheel assembly 3, 4, 5b is turned in the direction of the end position shown in FIG. 4, whereby the riding mower 1 turns to the left.

As appears from FIGS. 2–4, the two link elements 13a and 13b are, in each pivoting position of the wheel assembly 3, 4, 5b, positioned between the outer deflecting sprocket 10a and 10b, respectively, and the deflecting sprocket 14a and 14b, respectively, and the two link elements 16a and 16b, respectively, are, in each pivoting position of the wheel assembly 3, 4, 5b, positioned between the deflecting sprocket 14a and 14b, respectively, and the steering pulley 4.

FIG. 5 illustrates a link element 20 which can be used for coupling the runs 11a and 11b of the roller chain 11 to the roller chain 12a and 12b, respectively, i.e. as link element 13a and 13b, respectively, and for coupling the roller chains 12a and 12b to the roller chain 15a and 15b, respectively, i.e. as link element 16a and 16b, respectively.

The link element 20 is intended for coupling together two roller chains K1 and K2 in a straight line with each other. In FIG. 5, this line is designated L. The link element 20 is substantially in the shape of a cube having a recess 21 on one side and a recess 22 on the opposite side. The recess 21 is defined by two parallel, vertical (as seen in FIG. 5) flanges 23, and the recess 22 is defined by two parallel, horizontal (as seen in FIG. 5) flanges 24. The link element 20 is provided with a pin 25, which is insertable with a force fit into a hole 26 extending perpendicularly through the flanges 23 and intersecting the line L, and a pin 27, which is insertable with a force fit into a hole 28 extending perpendicularly through the flanges 24 and also intersecting the line L. When the pins 25 and 27 are inserted into the hole 26 and 28, respectively, they are turned 90° relative to each other around the line L.

When coupling together two roller chains K1 and K2, which should be bent in two planes perpendicular to one another, one proceeds as follows. An inner link 29 located at one end of one roller chain K1 is placed in the recess 21 in such a manner that its end sleeve is positioned just opposite the hole 26, whereupon the pin 25 is inserted into the hole 26 so as to extend through the end sleeve and form a hinge pin for the inner link. An inner link 30 located at one end of the other roller chain K2 is then placed in the recess 22 in such a manner that its end sleeve is positioned just opposite the hole 28, whereupon the pin 27 is inserted into the hole 28 so as to extend through the end sleeve and form a hinge pin for the inner link.

The holes 26 and 28 and, thus, the pins 25 and 27 inserted therein need not be perpendicular to each other, but may be turned at an angle other than 90° relative to each other around the line L. The angle of turning is determined by and equals the angle between the planes in which the coupled roller chains K1 and K2 should be bent.

The link element can be designed in various ways within the scope of the invention. As shown in FIG. 6, it may be in the form of, for instance, a bar 20' without recesses, which in the same way as the link element 20 has two transverse through holes extending perpendicularly to each other, and is adapted to be placed between the end inner links 29 and 30 of two roller chains K1 and K2 that are turned 90° relative to each other, and to be connected to the inner links by means of two conventional chain locks 31 and 32, each having two parallel bolts 33, 34 and 35, 36, respectively. One bolt 33 of one chain lock 31 is inserted into the end sleeve of one inner link 29, and its other bolt 34 is inserted into one hole of the bar 20'. One bolt 35 of the other chain lock 32 is inserted into the end sleeve of the other inner link 30, and its other bolt 36 is inserted into the other hole of the bar 20'. Just like the holes 26 and 28 in the link element 20, the holes in the bar 20' need not be perpendicular to each other, but may be turned at an angle other than 90° relative to each other about the longitudinal axis of the bar.

Other transmission chains than roller chains, e.g. sleeve-type chains, can be used in the steering device according to the invention and be coupled together by means of link elements according to the invention.

We claim:

1. A steering device in a riding mower that has a wheel assembly which is pivotable by means of said steering device, comprising:

a rotatable steering column;

a steering sprocket non-rotatably connected to said steering column;

a steering sprocket transmission chain which is flexible in a first plane defined by said steering sprocket and which extends over said steering sprocket, and, on one side of said steering sprocket, forms a first chain run extending along a first straight line and, on the other side of said steering sprocket, forms a second chain run extending along a second straight line;

two deflecting wheels positioned on opposite sides of said steering sprocket and located in a second and a third plane, respectively, with the second and third planes being non-coplanar with respect to said first plane;

first and second flexible transmitting chain extensions which are connected to a respective free end of said chain runs by way of a respective one of a pair of link elements so as to form a continued straight line with respect to said first and second chain runs, extend over a respective one of said deflecting wheels, and, at an opposite end, are connected to the wheel assembly, each said link element being positioned between said steering sprocket and a respective one of said deflecting wheels, and said link elements each having a first link element component to which a respective free end of said first and second chain runs is articulated about an upstream articulation axis and a second link element component to which a respective connecting end of said first and second transmitting chain extensions is articulated about a downstream articulation axis, and each of said upstream and downstream articulation axes of said link elements being offset at an angle corresponding to an angle of offset between a respective one of said second and third planes and said first plane.

2. The steering device as recited in claim 1 wherein said first and second link element components each include a hinge pin extending in a common direction with a respective one of said articulation axes.

3. The steering device as recited in claim 1 wherein both the second and third planes are each offset by 90° relative to the plane of the steering sprocket.

4. The steering device as recited in claim 1 wherein said second and third planes are vertical planes.

5. The steering device as recited in claim 1 wherein said transmitting chain extensions, between the respective deflecting wheels and the wheel assembly, are located in a common plane which is non-coplanar with respect to each of said second and third planes.

6. The steering device as recited in claim 5 wherein said first plane is non-coplanar with respect to said transmitting chain extensions common plane.

7. The steering device as recited in claim 6 further comprising a steering wheel pulley connected to the wheel assembly and lying on a steering wheel pulley plane that is co-planar with respect to said transmitting chain extensions common plane.

8. The steering device as recited in claim 5 further comprising a steering wheel pulley connected to the wheel assembly and lying on a steering wheel pulley plane that is co-planar with respect to said transmitting chain extensions common plane.

9. The steering device of claim 8 wherein each of said transmitting chain extensions includes a first segment and a second segment which are linked at a location between the steering wheel pulley and a respective one of said first and second deflecting wheels by a respective one of third and fourth link elements such that the first and second segments of each transmitting chain extension extend in a straight line, and said third and fourth link elements each having a first link element section to which a respective free end of said first segments is articulated about an upstream pivot axis and a second link element section to which a respective connecting end of said second segments is articulated about a downstream pivot axis, and said upstream and downstream pivot axes of each of said third and fourth link elements are offset at an angle corresponding to an angle of offset between a respective one of said second and third planes and said transmitting chain extensions common plane.

10. The steering device of claim 9 wherein said transmitting chain extensions common plane is a horizontal plane and each of said second and third planes is a vertical plane.

11. The steering device of claim 5 wherein each of said transmitting chain extensions includes a first segment and a second segment which are linked at a location between the wheel assembly and a respective one of said first and second deflecting wheels by a respective one of third and fourth link elements such that the first and second segments of each transmitting chain extension extend in a straight line, and said third and fourth link elements each having a first link element section to which a respective free end of said first segments is articulated about an upstream pivot axis and a second link element section to which a respective connecting end of said second segments is articulated about a downstream pivot axis, and said upstream and downstream pivot axes of each of said third and fourth link elements are offset at an angle corresponding to an angle of offset between a respective one of said second and third planes and said transmitting chain extensions common plane.

12. The steering device of claim 11 wherein said transmitting chain extensions common plane is a horizontal plane and each of said second and third planes is a vertical plane.

13. The steering device as recited in claim 11 wherein both the second and third planes are each offset by 90° relative to the plane of the steering sprocket.

14. The steering device as recited in claim 11 wherein both the second and third planes are each offset by 90° relative to the transmitting chain extensions common plane.

15. A riding lawn mower, comprising:

a front frame structure;

a wheel assembly pivotably connected to said front frame structure; and a steering device which includes, a rotatable steering column supported by said front frame structure, a steering sprocket non-rotatably connected to said steering column, a steering sprocket transmission chain which is flexible in a first plane defined by said steering sprocket and which extends over said steering sprocket, and, on one side of said steering sprocket, forms a first chain run extending along a first straight line and, on the other side of said steering sprocket, forms a second chain run extending along a second straight line, two deflecting wheels supported by said front frame structure on opposite sides of said steering sprocket and located in a second and a third plane, respectively, with the second and third planes being non-coplanar with respect to said first plane, and first and second flexible transmitting chain extensions which are connected to a respective free end of said chain runs by way of a respective one of a pair of link elements so as to form a continued straight line with respect to said first and second chain runs, extend over a respective one of said deflecting wheels, and, at an opposite end, are connected to said wheel assembly, each of said link elements being positioned between said steering sprocket and a respective one of said deflecting wheels, and said link elements each having a first link element component to which a respective free end of said first and second chain runs is articulated about an upstream articulation axis and a second link element component to which a respective connecting end of said first and second transmitting chain extensions is articulated about a downstream articulation axis, and said upstream and downstream articulation axes of said link elements are offset at an angle corresponding to an angle of offset between a respective one of said second and third planes and said first plane.

16. The riding mower of claim 15 wherein said wheel assembly includes a rear frame structure and a steering wheel pulley non-rotatably connected to said rear frame structure, and wherein each of said transmitting chain extensions includes a first segment and a second segment which are linked at a location between said steering wheel pulley and a respective one of said first and second deflecting wheels by a respective one of third and fourth link elements such that the first and second segments of each transmitting chain extension extend in a straight line, and said third and fourth link elements each having a first link element section to which a respective free end of said first segments is articulated about an upstream pivot axis and a second link element section to which a respective connecting end of said second segments is articulated about a downstream pivot axis, and said upstream and downstream pivot axes of each of said third and fourth link elements are offset at an angle corresponding to an angle of offset between a respective one of said second and third planes and said transmitting chain extensions common plane.

* * * * *